United States Patent
Halley et al.

(10) Patent No.: US 9,286,040 B2
(45) Date of Patent: Mar. 15, 2016

(54) SOFTWARE BUILDER

(71) Applicant: MobileSmith, Inc., Raleigh, NC (US)

(72) Inventors: Evan Halley, Cary, NC (US); Patrick Whitham Rhodes, Chapel Hill, NC (US); Robert M. Brinson, Rome, GA (US); John Varghese, Durham, NC (US); Scott Cottle, Raleigh, NC (US)

(73) Assignee: MobileSmith, Inc., Raleigh, NC (US)

( * ) Notice: Subject to any disclaimer, the term of this patent is extended or adjusted under 35 U.S.C. 154(b) by 0 days.

(21) Appl. No.: 14/372,940

(22) PCT Filed: Jan. 18, 2013

(86) PCT No.: PCT/US2013/022108
§ 371 (c)(1),
(2) Date: Jul. 17, 2014

(87) PCT Pub. No.: WO2013/109860
PCT Pub. Date: Jul. 25, 2013

(65) Prior Publication Data
US 2015/0128106 A1    May 7, 2015

Related U.S. Application Data

(60) Provisional application No. 61/587,837, filed on Jan. 18, 2012.

(51) Int. Cl.
*G06F 9/45* (2006.01)
*G06F 9/44* (2006.01)

(52) U.S. Cl.
CPC ... *G06F 8/41* (2013.01); *G06F 8/30* (2013.01)

(58) Field of Classification Search
CPC .................................................. G06F 8/30–8/41

USPC ................................................... 717/100–178
See application file for complete search history.

(56) References Cited

U.S. PATENT DOCUMENTS

| | | | | |
|---|---|---|---|---|
| 6,880,126 | B1 * | 4/2005 | Bahrs et al. | 715/210 |
| 7,184,801 | B2 * | 2/2007 | Farcasiu | 455/575.1 |
| 7,219,327 | B1 * | 5/2007 | Jacobs et al. | 717/104 |
| 7,877,727 | B2 * | 1/2011 | Sharp | G06F 8/38 715/762 |

(Continued)

FOREIGN PATENT DOCUMENTS

EP    1890227    2/2008

OTHER PUBLICATIONS

Christ, Adam M., "Bridging the Mobile App Gap", Oct. 2011, pp. 27-32.

(Continued)

*Primary Examiner* — Jason Mitchell
*Assistant Examiner* — Francisco Aponte
(74) *Attorney, Agent, or Firm* — Lee & Hayes, PLLC

(57) ABSTRACT

Concepts and technologies are described herein for a software builder. According to the concepts and technologies disclosed herein, a development platform can execute a software builder. The development system can receive input for creating a mobile application. In response to receiving the input, the development system can create build assets associated with the mobile application. The build assets can include components of the mobile application. The development system also can validate the build assets, store the build assets at a data storage location, compile the assets, and output the mobile application.

19 Claims, 4 Drawing Sheets

(56) References Cited

U.S. PATENT DOCUMENTS

| | | | |
|---|---|---|---|
| 8,006,224 B2* | 8/2011 | Bateman et al. | 717/104 |
| 8,261,231 B1 | 9/2012 | Hirsch et al. | |
| 8,286,128 B2* | 10/2012 | McCool | G06F 8/436 717/104 |
| 8,392,498 B2* | 3/2013 | Berg | H04J 3/0667 709/202 |
| 8,949,370 B1* | 2/2015 | Wu et al. | 709/217 |
| 2006/0047665 A1* | 3/2006 | Neil | 707/10 |
| 2006/0164550 A1 | 7/2006 | Yoshimoto et al. | |
| 2006/0236307 A1* | 10/2006 | Debruin et al. | 717/117 |
| 2006/0248121 A1* | 11/2006 | Cacenco et al. | 707/200 |
| 2007/0099659 A1 | 5/2007 | Borquez et al. | |
| 2007/0288890 A1* | 12/2007 | Wells | G06F 8/38 717/113 |
| 2008/0127233 A1* | 5/2008 | Neil et al. | 719/330 |
| 2008/0162570 A1 | 7/2008 | Kindig et al. | |
| 2009/0254892 A1* | 10/2009 | Yamashita | G06F 8/458 717/146 |
| 2010/0070971 A1* | 3/2010 | Shlomai et al. | 718/1 |
| 2010/0262948 A1* | 10/2010 | Melski | G06F 8/71 717/101 |
| 2011/0023016 A1* | 1/2011 | Khader et al. | 717/120 |
| 2011/0154287 A1* | 6/2011 | Mukkamala et al. | 717/105 |
| 2013/0055255 A1* | 2/2013 | Wagner et al. | 718/1 |
| 2013/0104100 A1* | 4/2013 | Mueller | 717/106 |
| 2014/0040862 A1* | 2/2014 | Webster et al. | 717/121 |

OTHER PUBLICATIONS

Maaloe, et al., "A Platform-Independent Framework for Application Development for Smart Phones", Jul. 2011, pp. 1-58.

International Search Report and Written Opinion dated Apr. 1, 2013 from PCT/US2013/22108.

* cited by examiner

SOFTWARE BUILDER

CROSS-REFERENCE TO RELATED APPLICATIONS

This application is the national phase entry of International Application No. PCT/US2013/022108 filed on Jan. 18, 2013, entitled, "Software Builder", which claims priority to U.S. Provisional Patent Application No. 61/587,837 entitled "Software N Builder," filed on Jan. 18, 2012, both of which are expressly incorporated herein by reference in their entirety.

BACKGROUND

Smartphones have become popular computing and communication devices throughout the world. Smartphones have become popular, at least in part, because the functionality of these devices may be easily customized by users by way of developing and/or installing mobile applications, thereby providing users with relevant functionality and connecting brands with interested consumers. There are now well over one million mobile applications available on the various smartphone mobile application stores, and some expect mobile application downloads to exceed seventy five billion by the end of 2014.

Development of mobile applications can be expensive. Furthermore, there can be long delays between ideation and delivery of mobile applications. After the mobile applications are delivered, it may be difficult to make changes to the mobile applications as the market matures. In addition to requiring heavy investment and long deployment times, the life cycle of mobile applications can be short due to a rapidly maturing and evolving marketplace and technology base. To further complicate matters, a wide variety of mobile devices and platforms continue to enter the market, making development of mobile applications more difficult due to the varying size, dimension, and pixel density of the screens or displays of the various devices.

Some attempted solutions for these problems have involved use of a translation/abstraction layer used during development of mobile applications. Developers use the translation/abstraction layer by writing code once in a non-native environment (e.g. Ruby) and the tool translates this code into multiple other languages or codes. Such translators, however, tend to seek the lowest common denominator among the various languages or codes in an attempt to ensure that the mobile application works in different environments. This can result in mobile applications that are not optimized for each (or even any) of the various targeted platforms. Furthermore, these and other development environments require prior software development knowledge and are only suited for technically savvy individuals. Additionally other methods are used to lower the cost of developing apps and getting to market quicker, such as the use of app "template" solutions which provides non-programmers limited configuration choices to modify an app's design theme and feature sets, while the function and GUI look and feel remains exactly the same from one app to the next.

It is with respect to these and other considerations that the disclosure made herein is presented.

SUMMARY

The present disclosure is directed to a software builder. A development platform for mobile applications can enable a tech savvy or non-tech savvy user-developer to design and/or configure mobile applications, the "look and feel" of the mobile applications, functionality of the mobile applications, and/or feature sets of the mobile applications, as well as initiating the build and compile process of the mobile application. A process may support manually or automatically building and/or initializing a back office or portal associated with the mobile application. A method and/or subsystem may then retrieve native, interpreted, precompiled or compiled source code units from a repository or bucket and links these units to the target platform, thus creating a functioning interface. This method or process may be followed by a manual or automated process that constructs and compiles the end mobile application and supports building and/or initiating a back office or portal associated with the mobile application.

According to various implementations, the development platform includes a software builder. The software builder can be configured to manage a build process of a mobile application developed using the development system. The build process can include compiling the mobile application for release. The software builder also can be configured with certificate, keystore and provisioning management for the application designer in a non-technical manner so that store releases, build management, and general distribution of the mobile application can be controlled. Thus, the software builder can be used to ensure that a mobile application can be compiled and distributed in a manner that does not derail current and/or future development.

A user of the development system can, by using the software builder functionality of the development system, manage store accounts and/or one or more enterprise accounts without requiring developers' and/or other technical personnel's involvement. Thus, the software builder can be used to allow local development and debugging to be driven in the same manner as the build process associated with the development system. Thus, a developer may need only a small set of resources and assets to recreate issues or make enhancements and customizations to a mobile application. A user thus may be relieved of dependence upon developers and/or technical personnel to make changes to a mobile application and/or can be enabled to monitor changes to the mobile application as the changes are being made.

The disclosed development system also can allow multiple systems to be run concurrently and can be managed via a queue. Requests can be passed to the software builder, or a build server hosting functionality associated with a software builder, with the least current load, thereby increasing release and/or delivery speeds. In addition, the build process can be driven by any code revision so that backward compatibility or mimicking previous versions can be simplified. In particular, a process can be loaded with a string of text (branch name) or revision number. The build process also can allow for revision tracking, since incremented versions of the compiled mobile applications can be stored. Thus, embodiments of the concepts and technologies disclosed herein can support application versioning.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
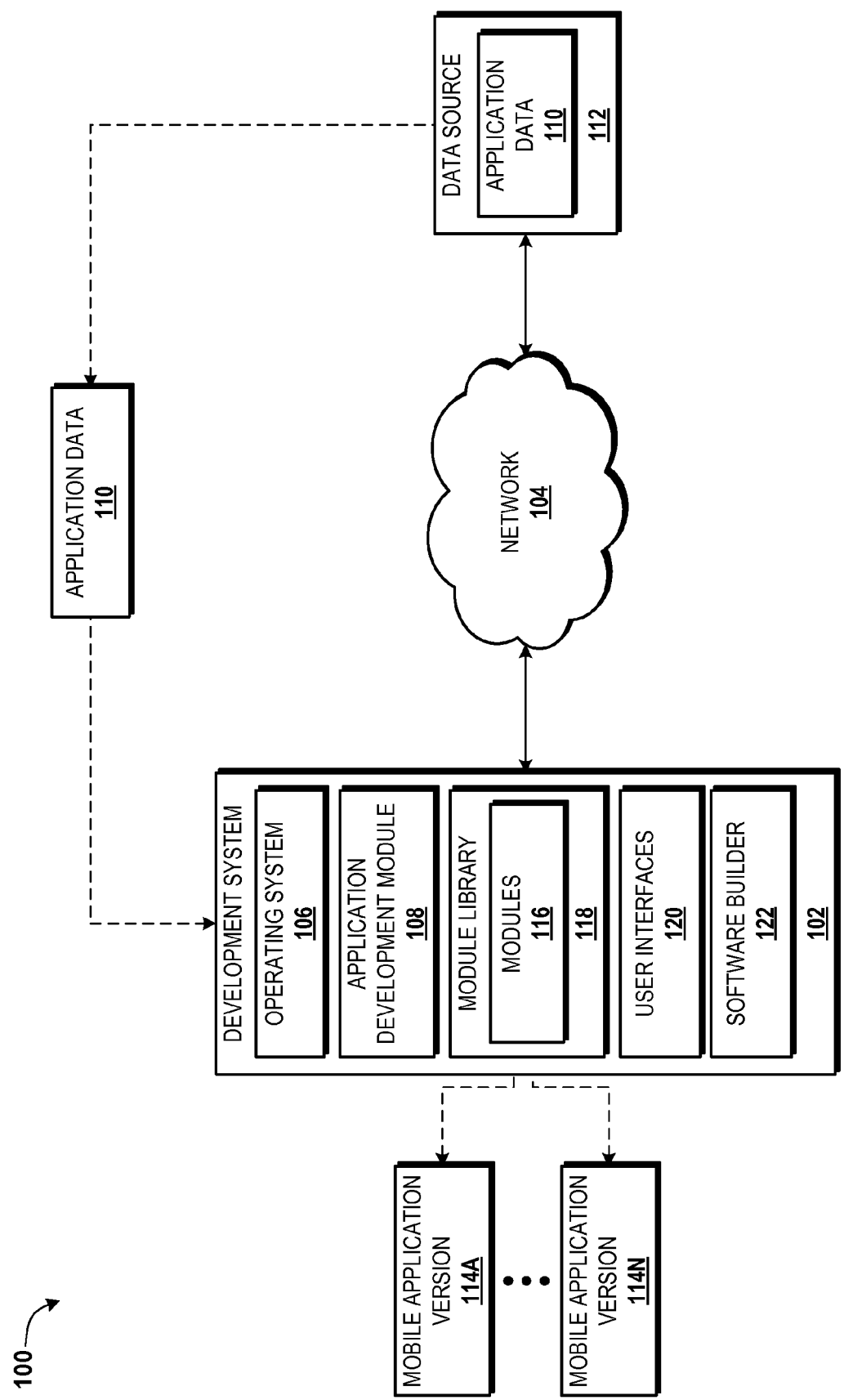
FIG. 1 is a block diagram illustrating one operating environment for the concepts and technologies disclosed herein, according to one embodiment.

In the following detailed description, references are made to the accompanying drawings that form a part hereof, and in which are shown by way of illustration specific embodiments or examples. It must be understood that the disclosed embodiments are merely exemplary of the concepts and technologies disclosed herein. The concepts and technologies disclosed herein may be embodied in various and alternative forms, and/or in various combinations of the embodiments disclosed herein.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of a development platform for mobile applications will be presented.

Referring now to FIG. 1, aspects of one operating environment 100 for the various embodiments presented herein will be described. The operating environment 100 shown in FIG. 1 includes a development system 102. According to various embodiments, the functionality of the development system 102 is provided by a personal computer ("PC") such as a desktop, tablet, or laptop computer system. In other embodiments, the functionality of the development system 102 is provided by other types of computing systems including, but not limited to, server computers, handheld computers, netbook computers, embedded computer systems, personal digital assistants, mobile telephones, smart phones, or other computing devices. In some embodiments, the development system 102 operates in communication with a communications network ("network") 104. In other embodiments, the development system 102 provides the functionality described herein for a development platform for mobile applications without communicating with other devices. In still other embodiments, the functionality of the development system 102 is provided by a server computer. As such, the illustrated embodiment should be understood as being illustrative, and should not be construed as being limiting in any way.

According to various embodiments, the development system 102 is configured to execute an operating system 106 and one or more application programs such as, for example, an application development module 108 and/or other application programs. The operating system 106 is a computer program for controlling the operation of the development system 102. The application development module 108 is an executable program configured to execute on top of the operating system 106 to provide various functions. As will be described in more detail below, the application development module 108 is an executable program configured to provide an interface for creating, editing, saving, and outputting mobile applications and/or for generating scripts, instructions, programs, modules, user interfaces, and/or other aspects of the mobile applications.

The application development module 108 is configured to receive, store, and/or obtain from a user, various application data 110. The application data 110 can correspond to variables, images, text, and/or indications of functionality that is desired for inclusion in a mobile application. In some embodiments, the application data 110 is stored at the development system 102 in a memory or other suitable data storage device. In other embodiments, the application data 110 is obtained or received by the application development module 108 from a user or external device or system, illustrated generally in FIG. 1 as a data source 112.

The data source 112 can include a user interfacing with the application development module 108 and/or a device or system that communicates with the development system 102 via the network 104. Thus, in various embodiments the functionality of the data source 112 is provided by hard drive, memory, or other data storage device associated with the development system; a server computer or other device configured to host or store the application data 110; a user interfacing with the application development module 108; and/or any other suitable entity. The application data 110 is received at and/or imported by the application development module 108 for use in developing and outputting mobile applications. An example method for obtaining the application data 110 is illustrated and described below with reference to FIG. 4.

The application development module 108 is configured to create, edit, store, provide previews of, and output mobile applications. According to various embodiments, the application development module 108 is configured to output one or more versions of a mobile application 114A-N (hereinafter collectively and/or generically referred to as "mobile application versions 114"), though this is not necessarily the case. In one contemplated embodiment, a first mobile application version 114A corresponds to a mobile application that is executable by devices running a member of the iOS family of operating systems from APPLE CORPORATION in Cupertino, Calif., and a second mobile application version 114N corresponds to a mobile application that is executable by devices running a member of the ANDROID family of operations systems from GOOGLE, INC. in Mountain View, Calif. Because the mobile application versions 114 can include versions of mobile applications executable by other platforms, it should be understood that these embodiments are illustrative, and should not be construed as being limiting in any way.

In some embodiments, the application development module 108 is configured to obtain the application data 110 and to use the application data 110 to generate a basic outline of a mobile application for which the mobile application versions 114 are to be created. In some embodiments, the application data 110 indicates one or more blocks of code, snippets, routines, or other blocks of code (hereinafter referred to as "modules") 116 that are to be included in a mobile application. The modules 116 can be stored in a module library 118. In some embodiments, the functionality of the module library 118 is provided by a data storage device associated with the development system 102. It should be understood that this embodiment is illustrative, and should not be construed as being limiting in any way.

The modules 116 are configurable blocks of executable code. Users can select or specify modules 116 to be added to a mobile application. Additionally, users can configure settings or variables included in the modules 116. According to various embodiments, the development system 102 guides users through configuration of the modules 116 via one or more user interfaces 120. The user interfaces 120 can present variables of the modules 116, provide data entry fields for specifying values of the variables, and/or provide mechanisms by which users can arrange, remove, add, and/or otherwise control the variables within the module 116.

The development system 102 also can execute and/or host a software builder application ("software builder") 122. The software builder 122 manages resource gathering, resource placement, application compilation, and application delivery for the mobile application and/or one or more mobile application versions 114 developed using the development system 102. The build process executed by the software builder 122 begins with the development system 102 creating build assets. As used herein, "build assets" can include various aspects of the mobile application including but not limited to, properties files, configuration files, credentials, certificates, imagery resources, combinations thereof, or the like.

The build assets can be validated. In particular, the build assets can be validated against various requirements. If the build assets (a "build") do not pass the validation phase, the software builder 122 can be configured to abort or altogether prevent the queuing of the build process. If the build passes the validation phase, the various build assets referenced in the build can be collected from their respective sources, which can include, but are not limited to, file transfer protocol ("FTP") sites, databases, data stores, server computers, other file paths, or the like.

The software builder 122 can be configured to compress the collected and assembled build assets into an appropriate compressed format, for example a .zip file, which can be stored at a location for consumption and/or other uses. According to various embodiments, a post can be made to a service in waiting, which can reside on a build machine instance. The functionality of the "build machines," which are described herein as being provided by the development system 102 via execution of the software builder 122, may be provided by various real and/or virtual hardware and/or software. In some embodiments, the functionality of the build machines can be provided by MAC-based UNIX systems, though this is not necessarily the case. In some embodiments, the MAC-based UNIX systems may be used to satisfy restrictions and/or dependencies on APPLE brand toolsets.

The functionality of the build machines also can be provided by other present and/or future systems and can be configured with the iOS operating system from APPLE CORPORATION in Cupertino, Calif., the ANDROID operating system from GOOGLE Corporation in Mountain View, Calif., a member of the WINDOWS operating system from Microsoft Corporation in Redmond Wash., other operating systems and/or SDKs. For purposes of illustrating the concepts and technologies disclosed herein, the build machines are described herein as being provided by the development system 102 via execution of the software builder 122. It should be understood that this embodiment is illustrative, and should not be construed as being limiting in any way.

The development system 102, or other entity functioning as the build machine, can wait to receive a request, which can include a location of the build. If the development system 102, the development system 102 can copy the resources associated with the build to a temporary directory on the machine file path. The development system 102 also can have repository driven versions of its own assets and resources, which also can be copied into the temporary directory. With the resources copied to the appropriate location, the development system 102 can invoke a main script for executing the build process.

In one embodiment of a setup phase of the script, based upon the credentials and compilation mode supplied in properties files, the build script may unlock/lock the keychain, add certificates to the keychain, extract the UUID from a provisioning profile, alter the provisioning profile, add the provision profile into a directory, which is useable, by xcodebuild or other executable file, clean up/reset the keychain, fork an APPLE script that clicks "always allow" on the screen that makes a newly injected certificate useable (this can be done by a developer at build time) or other relevant processes based on specific events. During this phase, properties keys can be copied/replaced in an AndroidManifest.xml file, an iOS info.plist file, and/or other OS configuration files.

At this point the compilation segment of the script can be invoked and the code base repository specified in the properties can be cloned into the temporary workspace. The iOS application can be compiled with the default certificate or a newly introduced certificate with xcodebuild or other executable files. The script also can use the xcrun command to create an application .ipa file, which can be used as an enterprise OTA file (or not at all), and to create a zipped.app file, which can be submitted to the APPLE ITUNES Store or other application stores for review.

Additionally, the ANDROID version of the mobile application can be compiled in but not limited to debug or release mode based on system inputs and configurations, and can be signed with either the default or a new keystore. Based upon the compilation type, the ANDROID application can be uploaded to the Google Play store, or created as a standalone enterprise OTA application. Once the compilation step completes based upon success/failure and the mode with which the applications are compiled, the results phase begins.

In the results phase, the development system 102 can gather the mobile applications (e.g., as .ipa files, .zip files, .apk files, etc.) for each build pending success and the links can be dynamically added to the results page, which along with files are sent back to the server location. The script can generate an email template, which can be sent to the application owner (included in properties). This email can contain links to download the OS-relevant applications. In some cases, the iOS application can be wrapped to allow the iOS application to be directly installed onto iOS-based devices. After the results have been transferred and emailed, the cleanup phase can begin. During the cleanup phase, directories, certificates and other assets can be removed from the file path so that space can be saved on the development system 102. According to various embodiments, multiple builds can be invoked and executed concurrently by the development system.

FIG. 1 illustrates one development system 102, one network 104, one data source 112, and two or more mobile application versions 114. It should be understood, however, that some implementations of the operating environment 100 include multiple development systems 102, multiple networks 104, and/or multiple data sources 112, and can be used to generate a single version of a mobile application. Thus, the illustrated embodiments should be understood as being exemplary, and should not be construed as being limiting in any way.

Figure 2:
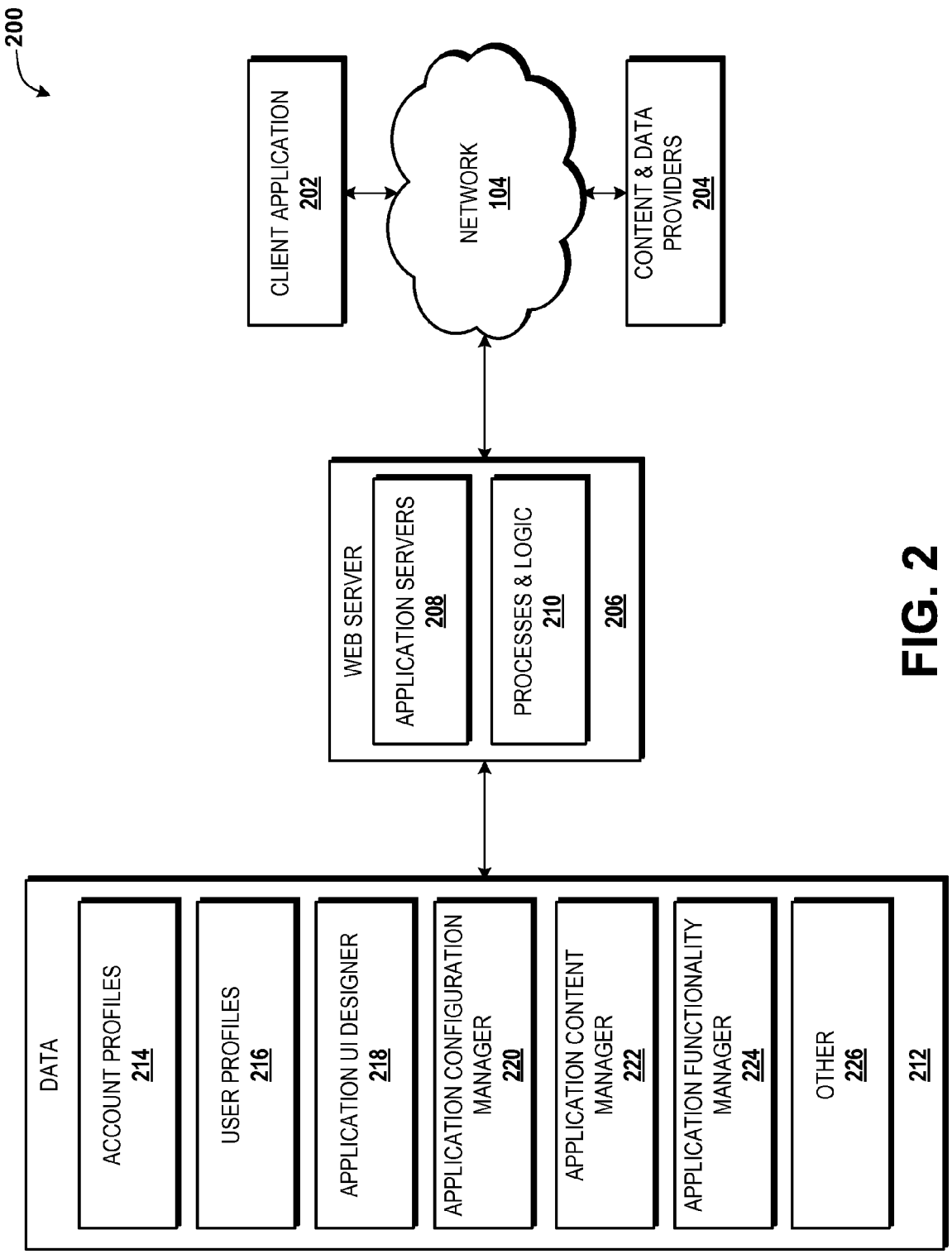
FIG. 2 is a block diagram illustrating another operating environment for the concepts and technologies disclosed herein, according to another embodiment.

Referring now to FIG. 2, aspects of another operating environment 200 for the various embodiments presented herein will be briefly described. It should be understood that the operating environment 200 can correspond to and/or include the development system 102 described herein, though this is not necessarily the case. As such, the described embodiment should be understood as being illustrative and should not be construed as being limiting in any way.

The operating environment 200 shown in FIG. 2 includes a client application 202 such as a web browser or stand-alone application. The operating environment 200 also includes one or more content and data providers 204 such as news feeds, data feeds, service and/data providers, or the like. The client application 202 and/or the content and data providers 204 can be accessed by the development system 102 via the network 104. In the embodiment shown in FIG. 2, the functionality of the development system 102 can be provided by a web server 206 that includes one or more application servers 208 and processes and logic 210.

The web server 206 can be configured to store or access data 212. The data 212 can include, for example, various information associated with an application development platform for a user and/or organization. In the illustrated embodiment, the data 212 includes, but is not limited to, account profiles 214, user profiles 216, an application UI designer 218, an application configuration manager 220, an application content manager 222, an application functionality manager 224, and/or other information 226. It should be understood that this embodiment is illustrative, and should not be construed as being limiting in any way.

The account profiles 214 can include profile data for accounts associated with the development system 102. The account profiles 214 can include data indicating available and/or blocked features, history information, or the like for a particular account. It should be understood that this embodiment is illustrative, and should not be construed as being limiting in any way. The user profiles 216 can include profile data for users or organizations associated with the development system 102. The user profiles 216 can include data indicating user names, user passwords or other authentication data, or the like for users. It should be understood that this embodiment is illustrative, and should not be construed as being limiting in any way.

The application UI designer 218 can include UIs for providing a design mode of application creation, as will be described herein in additional detail. The application configuration manager 220 can include UIs for providing a configuration mode as will be described herein in additional detail. The application content manager 222 can include UIs and/or data for providing a content management mode of operation as will be described herein in additional detail. The application functionality manager 224 can include UIs and/or data for controlling application functionality as will be described in additional detail herein. The other information 226 can any other information such as, for example, modules, user data, color schemes, or the like that may be used by the development system 102. It should be understood that this embodiment is illustrative, and should not be construed as being limiting in any way.

Some example modules 116 will be described in detail, according to various illustrative embodiments. In some embodiments, the modules 116 include a social media module. The social media module can include, but is not limited to, functionality for setting-up, viewing, sharing, and/or editing social networking media feeds; enabling or disabling various social networking functions; configuring views for displaying social networking data; and/or controlling various other features of social networking. Contemplated social media services can include, but are not limited to, the FACEBOOK social networking service, the TWITTER realtime messaging service, the YOUTUBE video service, other services, RSS feeds, combinations thereof, or the like. Various social networking services and/or other services can be interfaced with using the concepts and technologies disclosed herein. As such, it should be understood that the illustrated embodiment is illustrative, and should not be construed as being limiting in any way.

In some embodiments, the modules 116 include a list content detail module that can include, but is not limited to, features for creating lists for the mobile application. Via the list content detail module, users or other entities can configure page titles, list view field options, detail view field options, filter options, categories, sort orders, and sharing options associated with lists of the mobile application. The user also can configure various views of the lists, add/edit items in the lists, and take other actions, even post-deployment. It should be understood that this embodiment is illustrative, and should not be construed as being limiting in any way.

In some embodiments, the modules 116 can include a push notification module. The push notifications module can be used to enable push notifications and/or to control push notifications. In some embodiments, the push notification module can include functionality for generating, scheduling, and sending push notifications to all or specific subsets of users of the mobile applications. The push notifications module also can be used to add push notification services to a back office associated with the user account, via which the user can create push notifications for the mobile application. Additional details of the back office component of the push notifications functionality are discussed below. It should be understood that this embodiment is illustrative, and should not be construed as being limiting in any way.

In some embodiments, the modules 116 can include a surveys module. The surveys module includes, but is not limited to, functionality for creating surveys for presentation via the mobile application. Users can name the survey; set begin and expiration dates for the survey; provide instructions to users; provide a survey question, answer options, and options for adding answers and survey questions; provide an option and associated functionality for completing the survey; and a cancel button that can include, among other features, a pop-up box warning of cancellation; and the like. The surveys module also can include a back office component that presents survey results to the user. It should be understood that this embodiment is illustrative, and should not be construed as being limiting in any way.

In some embodiments, the modules 116 include an action alert module. The action alert module can include, but is not limited to, features for creating functionality for taking various types of action via the mobile application. Using the action alert module, for example, users can create an action item; define alert types such as email, phone calls, donations, education, notifications, or other action; set action dates; describe the action; and assign various actions to the set action types such as, for example, tap to call, tap to email, and the like. Furthermore, the action alert module can be used to provide additional alert-type-specific options. It should be understood that this embodiment is illustrative, and should not be construed as being limiting in any way.

Figure 3:
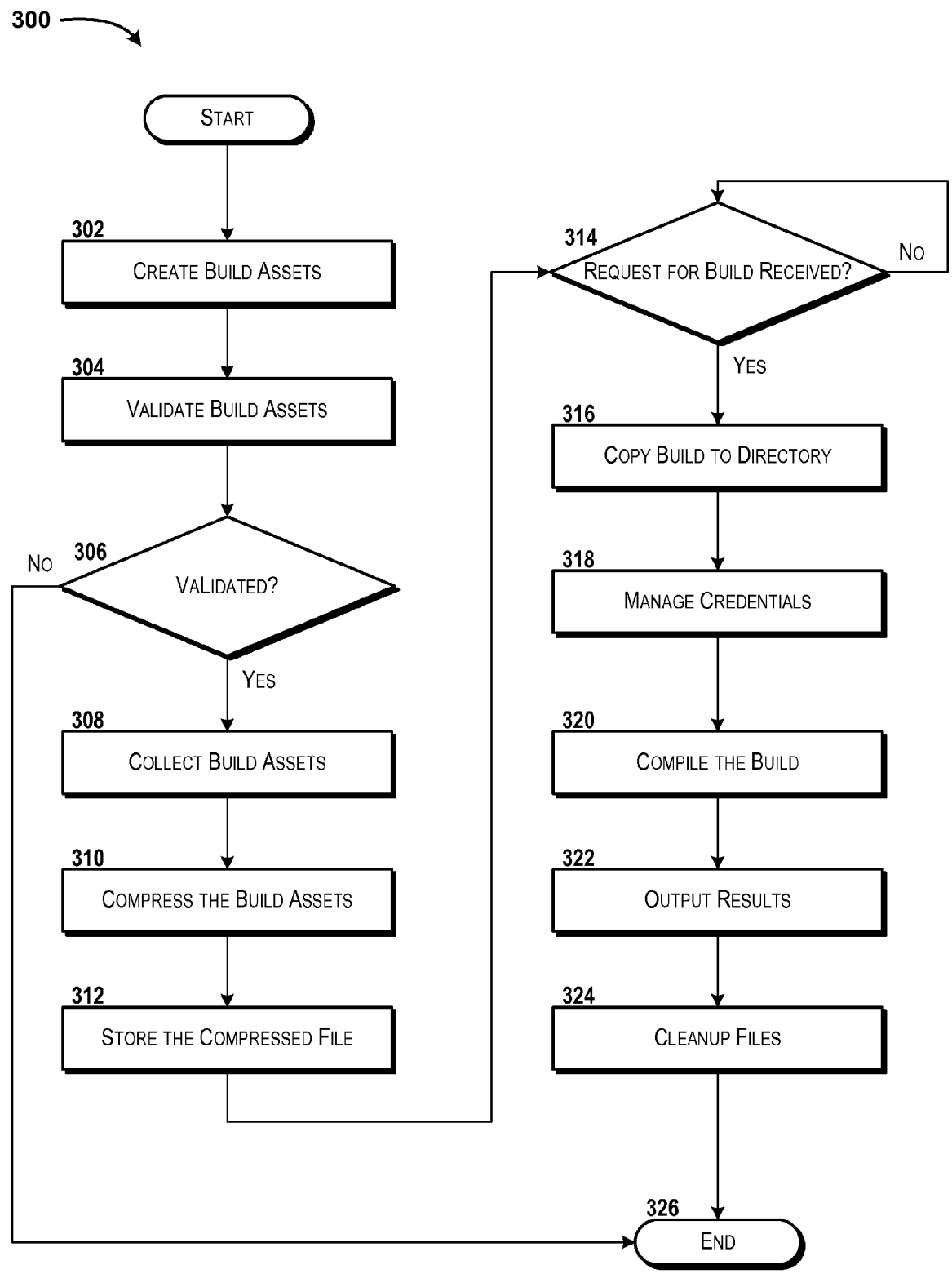
FIG. 3 is a flow diagram illustrating a method of building a mobile application, according to one embodiment.

Turning now to FIG. 3, aspects of a method 300 for building a mobile application using will be described in detail. It should be understood that the operations of the method 300 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in their respective entireties. Some or all operations of the methods disclosed herein, and/or substantially equivalent operations, can be performed by execution of computer-readable instructions included on a computer-storage media, as defined herein, and/or via execution of logic via various hardware incorporated into one or more logic circuits or other devices. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within a computing system or another device. The implementation is a matter of choice dependent on the performance and other requirements of the computing system or other device. Accordingly, the logical operations described herein are referred to variously as states, operations, structural devices, acts, or modules. These operations, structural devices, acts, and modules may be implemented in software, in firmware, in special purpose digital logic, in special purpose analog logic or other hardware, and/or in any combination thereof.

For purposes of illustrating and describing the concepts of the present disclosure, the method 300 is described as being performed by the development system 102 via execution of one or more application programs such as, for example, the software builder 122. As noted above, the development system 102 can include and/or can be configured to execute additional and/or alternative application programs. Similarly, devices other than the development system 102 can be configured to provide the functionality described herein with respect to FIG. 3 by way of executing various application programs. Thus, the illustrated embodiments should be understood as being illustrative, and not limiting in any way of the concepts and technologies disclosed herein.

The method 300 begins with operation 302, wherein the development system 102 creates build assets. As used herein, "build assets" can include various aspects of the mobile application including but not limited to, properties files, configuration files, credentials, certificates, imagery resources, combinations thereof, or the like. It therefore can be appreciated that operation 302 can correspond to a user specifying various modules 116 to be included in the mobile application, configuration of the modules 116, selection of feeds, image sources, or the like.

From operation 302, the method 300 proceeds to operation 304. In operation 304, the development system 102 can validate the build assets. In particular, the build assets can be validated against various requirements associated with one or more application stores, OS requirements, company requirements, or the like. From operation 304, the method 300 proceeds to operation 306, wherein the development system 102 determines if the validation of the build assets is successful.

If the development system 102 determines, in operation 306, that the validation of the build assets (a "build") is unsuccessful and/or does not pass the validation phase, the software builder 122 can be configured to abort the build process, and the method 300 can end. If the development system 102 determines, in operation 306, that the validation of the build assets is successful, the method 300 can proceed to operation 308.

In operation 308, the development system 102 can collect the various build assets referenced in the build from their respective sources. The sources for the build assets can include, but are not limited to, FTP sites, web sites, databases, data stores, server computers, other file paths, or the like. From operation 308, the method 300 proceeds to operation 310. In operation 310, the development system 102 can compress the collected and assembled build assets into an appropriate compressed format. According to various embodiments, the development system 102 can compress the build assets into a .zip file or other compressed format. From operation 310, the method 300 proceeds to operation 312, wherein the development system 102 stores the compressed file. The compressed file can be stored by the development system 102 for storage, consumption, and/or other uses.

From operation 312, the method 300 can proceed to operation 314. In operation 314, the development system 102 can determine if a request for the build has been received. The request, if received, can include or specify a location of the build. If the development system 102 determines that the request has not been received, the method 300 can return to operation 314. Thus, execution of the method 300 can pause at operation 314 until a request for the build is received. If the development system 102 determines, in operation 314, that the request is received, the method 300 can proceed to operation 316.

In operation 316, the development system 102 can copy the resources associated with the build to a temporary directory, for example a temporary directory that shares a file path with the development system. The development system 102 also can have repository driven versions of its own assets and resources, which also can be copied into the temporary directory.

From operation 316, the method 300 proceeds to operation 318, wherein the development system 102 can invoke a main script for executing the build process, and the build process can commence with credential management during a setup phase of the build process. In particular, in some embodiments of the setup phase, the development system 102 may unlock/lock the keychain, add certificates to the keychain, extract the UUID from a provisioning profile, alter the provisioning profile, add the provision profile into a directory, which may be useable by xcodebuild or other executable files, clean up/reset the keychain, fork an APPLE script that clicks "always allow" on the screen that makes a newly injected certificate useable (this can be done by a developer at build time) or other relevant processes based on specific events. During this phase, properties keys can be copied/replaced in an AndroidManifest.xml file, an iOS info.plist file, and/or other OS configuration files.

From operation 318, the method 300 proceeds to operation 320. In operation 320, the compilation segment of the build process can be invoked and the code base repository specified in the properties can be cloned into the temporary workspace by the development system 102. The iOS application can be compiled with the default certificate or a newly introduced certificate with xcodebuild or other executable files. The script also can use the xcrun command to create an application .ipa file, which can be used as an enterprise OTA file (or not at all), and to create a zipped.app file, which can be submitted to the APPLE ITUNES Store or other application stores for review. Additionally, or alternatively, an ANDROID version of the mobile application can be compiled in either debug or release mode, and can be signed with either the default or a new keystore. Based upon the compilation type, the ANDROID application can be uploaded to the Google Play store, or created as a standalone enterprise OTA application. Once the compilation step completes based upon success/failure and the mode with which the applications are compiled, the results phase can begin, as shown in operation 322.

In operation 322, the development system 102 can begin the results phase. In particular, the development system 102 can gather the mobile applications (e.g., as .ipa files, .zip files, .apk files, etc.) for each build pending success and the links can be uncommented in the results page, which along with files can be sent back to the server location. The script can generate an email template, which can be sent to the application owner (included in properties). This email can contain links to download the OS-relevant applications. In some cases, the iOS application can be wrapped to allow the iOS application to be directly installed onto iOS-based devices.

From operation 322, the method 300 proceeds to operation 324. In operation 324, the development system 102 can begin a cleanup phase. During the cleanup phase, directories, certificates and other assets can be removed from the file path so that space can be saved on the development system 102. According to various embodiments, multiple builds can be invoked and executed concurrently by the development system.

From operation 324, the method 300 proceeds to operation 326. The method 300 also can proceed to operation 326 from operation 306, if the development system determines that the build is not validated. The method 300 ends at operation 326.

Figure 4:
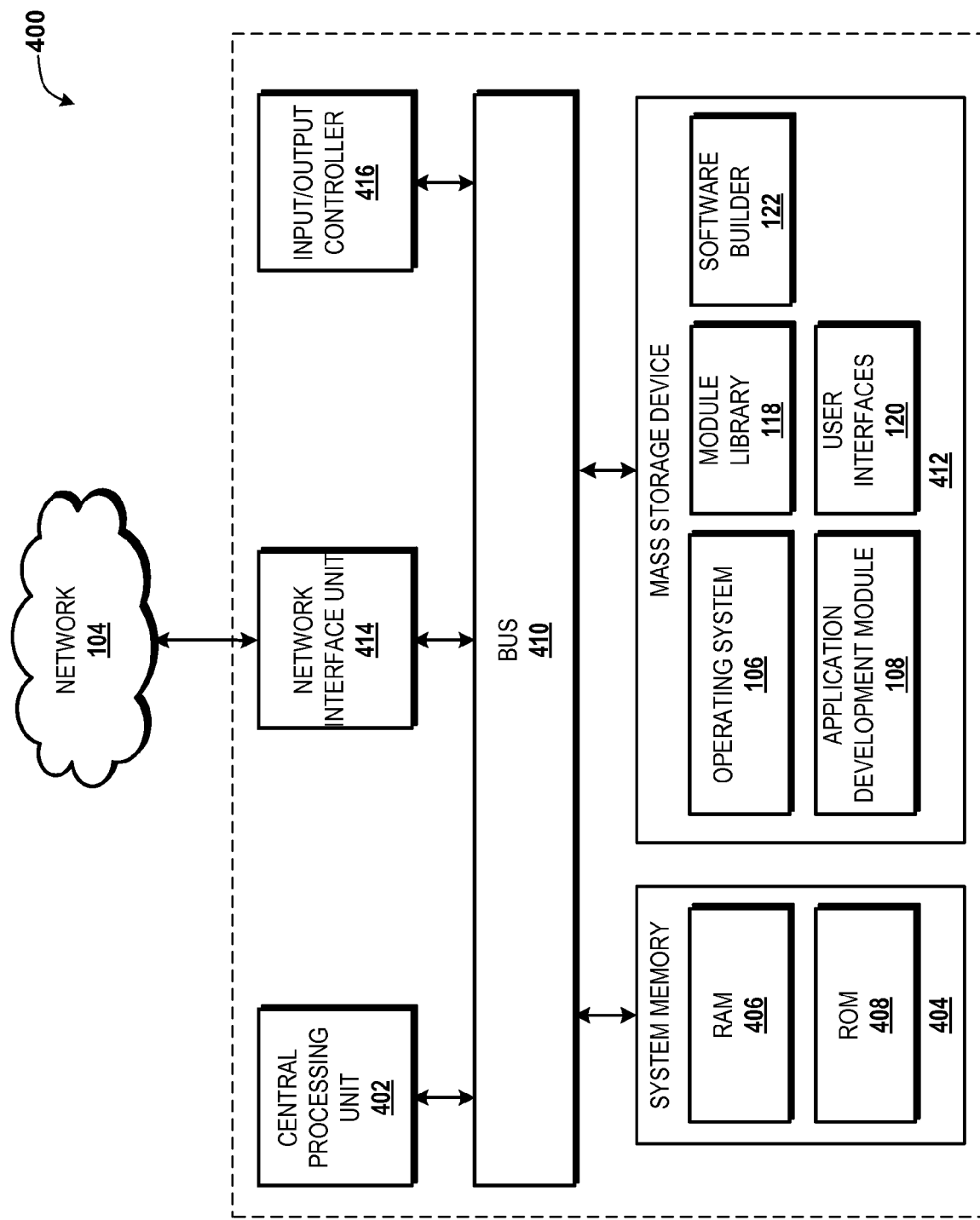
FIG. 4 is a block diagram illustrating a computer hardware and software architecture for a computing system capable of implementing aspects of the embodiments presented herein.

Turning now to FIG. 4, an illustrative computer architecture 400 for a computing device capable of executing software components described herein for a software builder will be described in detail. The computer architecture 400 shown in FIG. 4 illustrates an embedded control computer, a desktop computer, a laptop computer, a server computer, a cellular telephone, a smart phone, a PDA, combinations thereof, and the like, and can be configured to execute aspects of the software components presented herein. For example, a device having an architecture similar to the computer architecture 400 of FIG. 4 may serve as the development system 102 and/or a device in communication with the development system 102. It should be appreciated that the described software components can also be executed on other example computing environments.

The computer architecture 400 includes a central processing unit 402 (CPU), a system memory 404, which includes a random access memory (RAM) 406 and a read-only memory (ROM) 408, and a system bus 410 that can couple the system memory 404 to the CPU 402. A basic input/output system containing the basic routines that help to transfer information between elements within the computer architecture 400, such as during startup, can be stored in the ROM 408. The computer architecture 400 may further include a mass storage device 412. The mass storage device 412 can store the operating system 106, as well as other software, data, and various program modules. In the illustrated embodiment, the mass storage device 412 stores the application development module 108, the module library 118, and the user interfaces 120. Although not shown in FIG. 4, it should be understood that the modules 116 can be stored as part of the module library 118 and, therefore, by the mass storage device 412. Execution of the application development module 108 by the CPU 402 can cause a computing system embodying the computer architecture 400 to provide functionality such as that described above with reference to FIG. 1 and/or APPENDIX A.

The mass storage device 412 can be connected to the CPU 402 through a mass storage controller (not shown) connected to the bus 410. The mass storage device 412 and its associated computer-readable media can provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency ("RF"), infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of the claims, the phrase "computer storage medium" and variations thereof, does not include waves, signals, and/or other transitory and/or intangible communication media, per se.

According to various embodiments, a computing system embodying the computer architecture 400 may operate in a networked environment using logical connections to remote computers through a network such as the network 104. The computing system embodying the computer architecture 400 may connect to the network 104 through a network interface unit 414 connected to the bus 410. It should be appreciated that the network interface unit 414 may also be utilized to connect to other types of networks and remote computer systems. The computing system embodying the computer architecture 400 may also include an input/output controller 416 for receiving and processing input from a number of other devices, including a keyboard, mouse, or electronic stylus (not illustrated). Similarly, the input/output controller 416 may provide output to a video display, a printer, or other type of output device (also not illustrated).

As mentioned briefly above, a number of program modules and data files may be stored in the mass storage device 412 and RAM 406 of a computing system embodying the computer architecture 400. The program modules and data files include, but are not limited to, the operating system 106 suitable for controlling the operation of a desktop computer, laptop computer, server computer, mobile telephone, and/or other computing device or environment. The mass storage device 412, ROM 408, and RAM 406 may also store one or more program modules. In particular, while shown as stored by the mass storage device 412, it should be understood that any of the mass storage device 412, the ROM 408, and the RAM 406 may store the application development module 108 for execution by the CPU 402. The mass storage device 412, the ROM 408, and the RAM 406 may also store other types of program modules and/or data including, but not limited to, the application data 110, the modules 116, the module library 118, the user interfaces 120, and/or the mobile application versions 114.

Software modules, such as the application development module 108 may be associated with the system memory 404, the mass storage device 412, or other data storage. The application development module 108 may include software instructions that, when loaded into the CPU 402 and executed, transform a general-purpose computing system into a special-purpose computing system customized to facilitate all, or part of, the techniques for identifying backup coverage in a wireless network as disclosed herein. As detailed throughout this description, the program modules may provide various tools or techniques by which the computing system embodying the computer architecture 400 may participate within the overall systems or operating environments using the components, logic flows, and/or data structures discussed herein.

The CPU 402 may be constructed from any number of transistors or other circuit elements, which may individually or collectively assume any number of states. More specifically, the CPU 402 may operate as a state machine or finite-state machine. Such a machine may be transformed to a second machine, or specific machine by loading executable instructions contained within the program modules. These computer-executable instructions may transform the CPU 402 by specifying how the CPU 402 transitions between states, thereby transforming the transistors or other circuit elements constituting the CPU 402 from a first machine to a second machine, wherein the second machine may be specifically configured to support real time event driven energy management. The states of either machine may also be transformed by receiving input from one or more user input devices associated with the input/output controller 416, the network interface unit 414, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 404 when the software is encoded therein. For example, the software may transform the state of transistors, capacitors, or other discrete circuit elements constituting the system memory 404.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Based on the foregoing, it should be appreciated that a software builder has been disclosed herein. Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A development platform comprising a computer having a processor and a memory storing executable instructions that, when executed by the processor, cause the computer to:
   receive input for creating a first version of a mobile application;
   in response to receiving the input, create build assets associated with the first version of the mobile application, the build assets comprising components of the first version of the mobile application;
   validate the build assets;
   determine whether the build assets are validated;
   if the build assets are determined to be validated,
      collect the build assets from sources associated with the build assets,
      compress the build assets into a compressed file corresponding to a build, and
      store the compressed file at a data storage location associated with the development platform;
   determine whether a request for the build is received, the request specifying a location of the compressed file; and
   if the request for the build is determined to have been received,
      copy the build to a temporary directory,
      compile the build by executing two compiling operations concurrently, a first of the two compiling operations for generating the first version of the mobile application for execution on a first mobile device executing a first operating system, and a second of the two compiling operations for generating a second version of the mobile application for execution on a second mobile device executing a second operating system, and
      output the first version of the mobile application.

2. The development platform of claim 1, further comprising executable instructions that, when executed by the processor, cause the computer to:
   manage credential associated with the development platform during compiling of the build; and
   remove files from the temporary directory after outputting the first version of the mobile application.

3. The development platform of claim 2, wherein the temporary directory comprises a temporary directory sharing a file path with the development platform.

4. The development platform of claim 1, wherein outputting the first version of the mobile application comprises generating an electronic mail message indicating that the first version of the mobile application is available.

5. The development platform of claim 1, wherein outputting the first version of the mobile application comprises providing the first version of the mobile application to an entity as an over the air installation file for installing the first version of the mobile application to a mobile device without uploading the first version of the mobile application to an application store.

6. The development platform of claim 1, wherein outputting the first version of the mobile application comprises uploading the first version of the mobile application to an application store.

7. The development platform of claim 1, further comprising a data storage device that stores a module library including a plurality of modules, wherein the build assets comprise at least one of the plurality of modules.

8. The development platform of claim 1, wherein outputting the first version of the mobile application comprises creating a results page containing a link to the first version of the mobile application.

9. The development platform of claim 1, wherein the first version of the mobile application is compiled in a debug mode based, at least in part, on a system configuration.

10. A computer-implemented method for developing a mobile application, the method comprising:
receiving, at a computer executing a development system, input for creating a first version of a mobile application;
in response to receiving the input, creating, by the computer, build assets associated with the first version of the mobile application, the build assets comprising components of the first version of the mobile application;
attempting validation of the build assets;
determining that the validation of the build assets is successful;
in response to determining that the validation of the build assets is successful,
collecting the build assets from sources associated with the build assets,
compressing the build assets into a compressed file corresponding to a build, and
storing the compressed file at a data storage location associated with the development system;
determining that a request for the build is received, the request specifying a location of the compressed file;
in response to determining that a request for the build is received, copying the compressed file from the data store location to a temporary directory and sharing a file path with the development system;
compiling the build stored at the temporary directory by executing two compiling operations concurrently, a first of the two compiling operations for generating the first version of the mobile application for execution on a first mobile device executing a first operating system, and a second of the two compiling operations for generating a second version of the mobile application for execution on a second mobile device executing a second operating system; and
outputting the first version of the mobile application when compiling the build is completed.

11. The method of claim 10, wherein compiling the build further comprises:
managing credentials associated with the development platform; and
removing the compressed file from the temporary directory after outputting the first version of the mobile application.

12. The method of claim 10, wherein outputting the first version of the mobile application comprises:
generating an electronic mail message indicating that the first version of the mobile application is available; and
uploading the first version of the mobile application to an application store.

13. The method of claim 10, wherein outputting the first version of the mobile application comprises providing the first version of the mobile application to an entity as an over the air installation file for installing the first version of the mobile application to a mobile device without uploading the first version of the mobile application to an application store.

14. The method of claim 10, wherein outputting the first version of the mobile application comprises creating a results page containing a link to the first version of the mobile application.

15. The method of claim 10, wherein the first version of the mobile application is compiled in a debug mode based, at least in part, on a system configuration.

16. A computer storage medium comprising computer-executable instructions that, when executed by a computer, cause the computer to:
receive input for creating a first version of a mobile application;
in response to receiving the input, create build assets associated with the first version of the mobile application, the build assets comprising components of the first version of the mobile application;
attempt validation of the build assets;
determine that validation of the build assets is successful;
collect the build assets from sources associated with the build assets;
compress the build assets into a compressed file corresponding to a build;
store the compressed file at a data storage location associated with the development system;
determine that a request for the build is received, the request specifying a location of the compressed file;
copy the compressed file from the data storage location to a temporary directory;
compile the build stored at the temporary directory by executing two compiling operations concurrently, a first of the two compiling operations for generating the first version of the mobile application for execution on a first mobile device executing a first operating system, and a second of the two compiling operations for generating a second version of the mobile application for execution on a second mobile device executing a second operating system; and
output the first version of the mobile application when compilation of the build is completed.

17. The computer storage medium of claim 16, wherein outputting the first version of the mobile application comprises creating a results page containing a link to the first version of the mobile application.

18. The computer storage medium of claim 16, wherein the first version of the mobile application is compiled in a debug mode based, at least in part, on a system configuration.

19. The computer storage medium of claim 16, wherein the temporary directory shares a file path with the computer.

* * * * *